(12) United States Patent
Chadsey et al.

(10) Patent No.: US 9,998,042 B2
(45) Date of Patent: Jun. 12, 2018

(54) TORQUE DISTURBANCE CANCELLATION FOR A MOTOR

(71) Applicant: Seagate Technology LLC, Cupertino, CA (US)

(72) Inventors: Matthew McLeod Chadsey, Mead, CO (US); John Charles Purkett, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 598 days.

(21) Appl. No.: 13/871,591

(22) Filed: Apr. 26, 2013

(65) Prior Publication Data

US 2014/0246998 A1    Sep. 4, 2014

Related U.S. Application Data

(60) Provisional application No. 61/772,104, filed on Mar. 4, 2013.

(51) Int. Cl.
*H02P 6/06*     (2006.01)
*H02P 6/10*     (2006.01)
*H02P 23/04*    (2006.01)

(52) U.S. Cl.
CPC ............... *H02P 6/10* (2013.01); *H02P 23/04* (2013.01)

(58) Field of Classification Search
CPC ...... G06F 3/04883; G06F 3/011; G06F 3/016; G06F 3/017; A63F 13/211
See application file for complete search history.

(56) References Cited

U.S. PATENT DOCUMENTS

| | | |
|---|---|---|
| 2,476,787 A | 7/1949 | Wellings |
| 3,569,848 A | 3/1971 | Esteban |
| 3,649,912 A | 3/1972 | Tetsuji |
| 3,947,736 A | 3/1976 | Byers |
| 3,967,173 A | 6/1976 | Stich |
| 4,047,083 A | 9/1977 | Plunkett |
| 4,123,692 A | 10/1978 | Gilmore |
| 4,668,898 A | 5/1987 | Harms |

(Continued)

OTHER PUBLICATIONS

Lee, Kim and Kwon, Commutation Torque Ripple Reduction in a Position Sensorless Brushless DC Motor Drive, IEEE Transactions on Power Electronics, Nov. 2006, pp. 1762-1768, vol. 21, No. 6.

(Continued)

*Primary Examiner* — Shawki S Ismail
*Assistant Examiner* — Zoheb Imtiaz
(74) *Attorney, Agent, or Firm* — Cesari & Reed, LLP; Kirk A. Cesari (57) ABSTRACT

A circuit may be configured to adjust a correction signal for each phase of an electric motor based on a rotational position of a spindle of the electric motor, generate a distorted waveform based on the correction signal, and drive the electric motor in response to the distorted waveform. In some examples, back electromotive force (BEMF) may be determined in order to adjust a motor drive waveform, which may reduce or eliminate motor vibrations. A motor drive signal may be pre-warped (i.e. distorted) such that when the correctional signal and drive signals are combined, there is a reduction in acoustic emissions or motor vibrations. Other parameters, such as cogging torque, may be measured to reduce motor vibration and acoustic emissions.

11 Claims, 8 Drawing Sheets

(56) References Cited

U.S. PATENT DOCUMENTS

| | | |
|---|---|---|
| 4,767,711 A | 8/1988 | Schuler |
| 5,028,852 A | 7/1991 | Dunfield |
| 5,327,064 A | 7/1994 | Arakawa |
| 5,374,857 A | 12/1994 | Carobolante |
| 5,473,230 A * | 12/1995 | Dunn ............... H02P 23/16 318/432 |
| 5,636,193 A * | 6/1997 | Ohmi ............... G11B 19/2018 318/611 |
| 5,936,365 A * | 8/1999 | Li ............... H02P 6/182 318/400.24 |
| 6,046,554 A * | 4/2000 | Becerra ............... H02P 6/182 318/400.34 |
| 6,094,022 A | 7/2000 | Schillaci |
| 6,137,253 A | 10/2000 | Galbiati |
| 6,150,963 A | 11/2000 | Boscolo |
| 6,256,163 B1 | 7/2001 | Schmidt |
| 6,385,067 B2 | 5/2002 | Galbiati |
| 6,420,847 B1 | 7/2002 | Galbiati |
| 6,570,360 B1 | 5/2003 | Freeman |
| 6,704,159 B2 | 3/2004 | Ding |
| 6,768,623 B1 | 7/2004 | Shen |
| 6,777,907 B2 | 8/2004 | Ho |
| 7,026,774 B2 | 4/2006 | Inaba |
| 7,042,186 B2 | 5/2006 | Stancu |
| 7,106,546 B2 | 9/2006 | Galbiati |
| 7,139,401 B2 | 11/2006 | Culman |
| 7,184,288 B2 | 2/2007 | Galbiati |
| 7,215,094 B2 | 5/2007 | Maiocchi |
| 7,262,568 B2 | 8/2007 | Takada |
| 7,327,103 B1 | 2/2008 | El-Sadi |
| 7,482,777 B2 | 1/2009 | Tomigashi |
| 7,834,568 B2 | 11/2010 | Galbiati |
| 7,893,643 B2 | 2/2011 | Bonvin |
| 8,044,619 B2 | 10/2011 | Maiocchi |
| 8,294,400 B2 * | 10/2012 | Harmer ............... G11B 21/12 318/400.34 |
| 8,310,192 B2 | 11/2012 | Bonvin |
| 8,634,283 B1 * | 1/2014 | Rigney ............... G11B 5/59666 360/75 |
| 2002/0186491 A1 * | 12/2002 | Hill ............... G11B 5/5521 360/67 |
| 2004/0100720 A1 * | 5/2004 | Swize ............... G11B 21/02 360/75 |
| 2007/0097543 A1 * | 5/2007 | Saitoh ............... G11B 5/5582 360/97.19 |
| 2007/0285828 A1 * | 12/2007 | Yamashita ............... G11B 5/54 360/75 |
| 2007/0296375 A1 * | 12/2007 | Sakaguchi ............... H02P 6/08 318/811 |
| 2008/0007271 A1 * | 1/2008 | Smith ............... G11B 5/5526 324/601 |
| 2008/0143288 A1 * | 6/2008 | Iwaji ............... G11B 19/28 318/722 |
| 2008/0218892 A1 * | 9/2008 | Haustein ............... G09G 3/3208 360/69 |
| 2010/0052585 A1 | 3/2010 | Bonvin |
| 2010/0052587 A1 | 3/2010 | Bonvin |
| 2010/0123419 A1 | 5/2010 | Bonvin |
| 2010/0156335 A1 * | 6/2010 | Betta ............... G05B 13/02 318/561 |
| 2010/0182715 A1 * | 7/2010 | Harmer ............... G11B 21/12 360/75 |
| 2011/0141612 A1 * | 6/2011 | Oh ............... G11B 21/12 360/75 |
| 2011/0193547 A1 * | 8/2011 | Max ............... G01R 31/2841 324/76.19 |
| 2013/0033212 A1 | 2/2013 | Hong |

OTHER PUBLICATIONS

Blount, Noise Reduction Using Dampening in Voice Coil Motors/Actuators of Hard Disk Drives, IBM Storage Technology, Oct. 2001, San Jose, California.

* cited by examiner

| Sgate | Measured BEMF Value | Cogging Torque Value | Profile Value | KCORRECT_A | KCORRECT_B | KCORRECT_C |
|---|---|---|---|---|---|---|
| N | BEMF_N | CT_N | PV_N | KCORRECT_A_N | KCORRECT_B_N | KCORRECT_C_N |
| N+1 | BEMF_N+1 | CT_N+1 | PV_N+1 | KCORRECT_A_N+1 | KCORRECT_B_N+1 | KCORRECT_C_N+1 |
| ... | ... | ... | ... | ... | ... | ... |
| M | BEMF_M | CT_M | PV_M | KCORRECT_A_M | KCORRECT_B_M | KCORRECT_C_M |

TORQUE DISTURBANCE CANCELLATION FOR A MOTOR

CROSS-REFERENCE TO RELATED APPLICATIONS

The present application claims priority to pending U.S. provisional patent application Ser. No. 61/772,104, filed Mar. 4, 2013, entitled "Spindle Driver", the contents of which are hereby incorporated by reference in its entirety.

BACKGROUND

The present disclosure generally relates to motor drive systems, such as a spindle motor drive system of a hard disc drive.

SUMMARY

In certain embodiments, an apparatus may comprise a circuit configured to adjust a correction signal for each phase of an electric motor based on a rotational position of a spindle of the electric motor. The circuit may also be configured to generate a distorted waveform based on the correction signal and drive the electric motor in response to the distorted waveform.

In certain embodiments, a method may comprise determining a correction signal for an electric motor, generating a warped waveform based on the correction signal, and applying the warped waveform to control operation of an electric motor.

In certain embodiments, an apparatus may comprise an application specific integrated circuit (ASIC) including an operating circuit configured to adjust a correction signal for each phase of the electric motor based on a rotational position of a spindle of an electric motor. The operating circuit may also be configured to generate a distorted waveform based on the correction signal and an output to provide the distorted waveform to the electric motor.

DETAILED DESCRIPTION

In the following detailed description of the embodiments, reference is made to the accompanying drawings which form a part hereof, and in which are shown by way of illustration of specific embodiments. It is to be understood that features of the various described embodiments may be combined, other embodiments may be utilized, and structural changes may be made without departing from the scope of the present disclosure.

In some embodiments, an electric motor can be used to spin data storage discs at a prescribed rate of speed, which may enable a head to read data stored in tracks on the data storage discs. The motor, which may be physically connected to the discs, may also be electrically connected to a motor driver. Motor vibrations may cause acoustical emissions and component failure and can occur at specific frequencies that may be related to how fast a motor spindle is rotating, the geometry of the motor, and the harmonic content of the back electromotive force (BEMF), which is generated by the changing electric field of a rotating electric motor. A circuit may measure the BEMF and the values of other parameters, and a signal correction circuit may use the measurements to generate output voltage waveforms that, when applied to the motor, can eliminate vibrations and acoustic emissions. In some embodiments, the BEMF measurements can be digitized by an analog to digital converter, and then may be analyzed by a signal correction circuit which can create a digital representation of a pre-warped waveform. The pre-warped waveform may then be input into a register and summed with a waveform stored in a profile memory to form the digitized pre-warped waveform.

Figure 1:
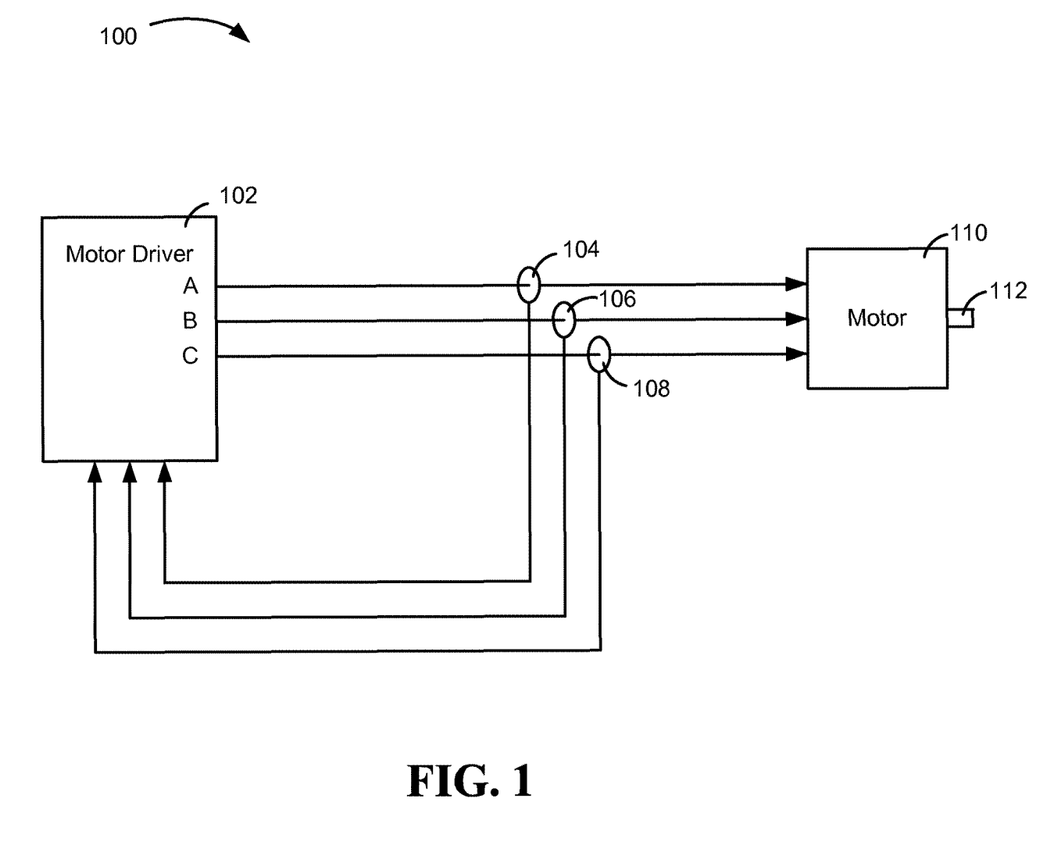
FIG. 1 is a diagram of a system for torque disturbance cancellation for a motor, in accordance with certain embodiments of the present disclosure.

Referring to FIG. 1, a system for torque disturbance cancellation for a motor is shown and generally designated 100. The system 100 may include a motor driver 102, BEMF detectors 104-108, a motor 110, and a spindle 112 that can be configured as a feedback network to eliminate acoustic emissions.

The motor driver 102 can be responsible for driving the motor 110 by generating output waveforms that can modify the speed and rotational direction of the motor. The motor driver 102 may have a single or multiple phase output. A motor driver waveform can have many profiles, including that of a sinusoid or a double arch, for example. The motor driver 102 may be configured to generate a pre-warped signal that, when combined with a measured BEMF, can eliminate acoustic emissions. The motor driver may be voltage-mode controlled or it may be current-mode controlled. For example, in a voltage-mode controlled motor, the pre-warped signal may include a pre-warped applied phase voltage.

BEMF detectors 104, 106, and 108, can be used to obtain BEMF measurements and route the information to the motor driver where it can be used to generate a pre-warped signal to reduce or eliminate acoustic emissions. The BEMF measurements may be taken when the motor 110 has finished the spin-up process, during other parts of the motor's operational cycle, or may be taken dynamically.

The motor 110 can be a plurality of types, including AC, DC, single phase, three-phase, and so forth. In some examples, the motor 110 is a three-phase, brushless DC motor and when the motor 110 rotates, it can generate a BEMF and can also rotate a spindle 112, which for example may rotate a data storage disc.

Figure 2:
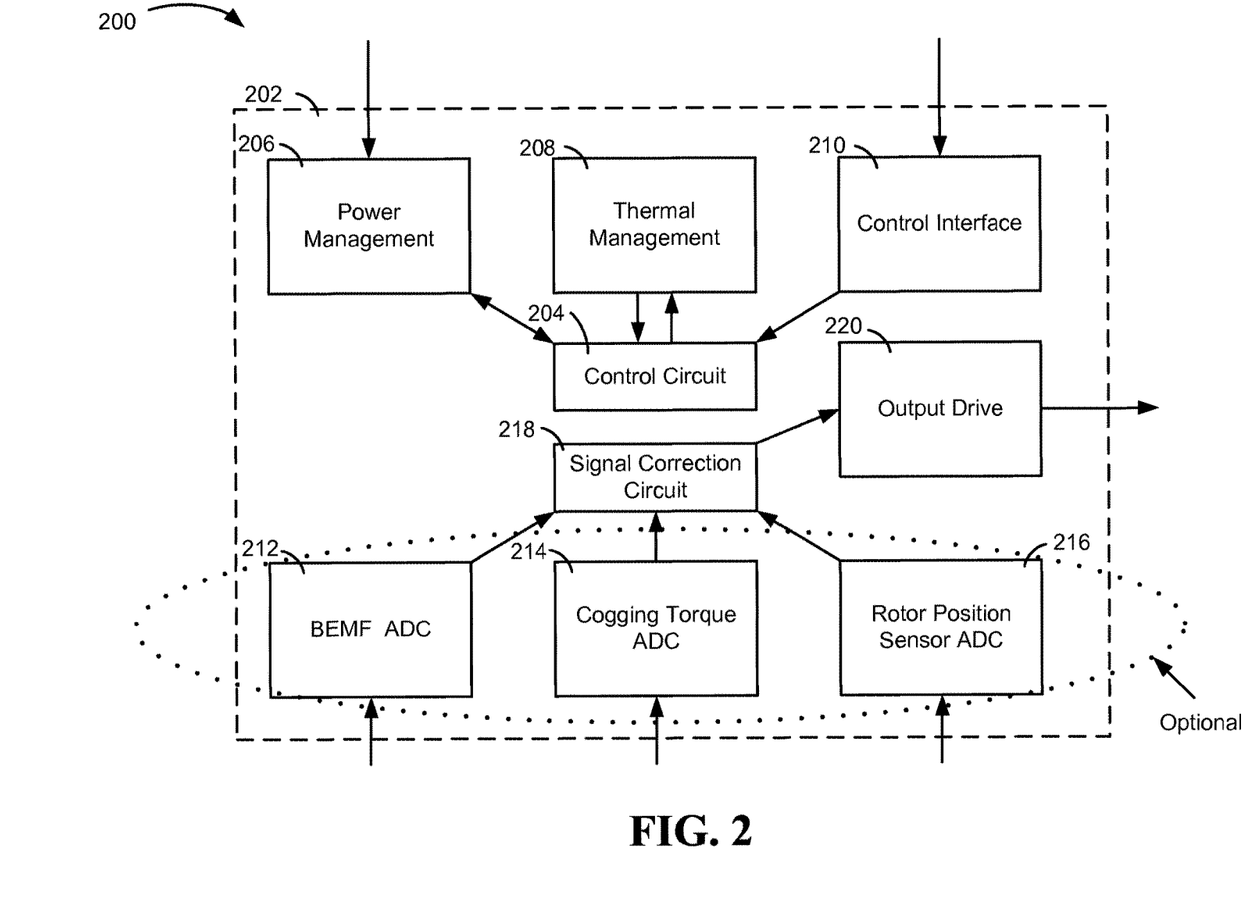
FIG. 2 is a diagram of a system for torque disturbance cancellation for a motor, in accordance with certain embodiments of the present disclosure.

Referring to FIG. 2, a system for torque disturbance cancellation for a motor is shown and generally designated 200. The system 200 may include a motor controller 202, which may be an application specific integrated circuit (ASIC) 202 comprising one or more circuits or devices to perform the functions described herein. The motor controller 202 may include control circuit 204, which may be a microprocessor, logic circuitry, discrete components, or other circuitry or combination of circuits or memory, which can control different circuits and systems responsible for the motor controller's 202 functional circuits, such as power management 206, thermal management 208, and a control interface 210.

The motor controller 202 may also contain circuits and systems for modifying a signal, such as performing signal correction to eliminate acoustic emissions. BEMF measurements may be input to a BEMF analog to digital converter (ADC) circuit 212, where the measured BEMF can be digitized for further processing. In some examples, the motor controller 202 may also contain circuitry 214 to digitize cogging torque measurements and circuitry 216 for rotor position sensor measurements. Additional circuits may be present to measure parameters not listed, such as the temperature or physical orientation of the motor. The operating parameter measurement ADCs, such as the BEMF ADC and the cogging torque ADC, may be optional and in some embodiments may not be used.

A signal correction circuit (SCC) 218 may be used to generate a pre-warped signal or waveform that may be based on analysis and processing of the digitized BEMF, cogging torque, rotor position data, or any combination thereof. The SCC 218 may contain one or more analog to digital converters (ADCs), one or more digital to analog converters (DACs), digital or analog registers, microprocessors, logic circuitry, memory, or additional circuitry, and examples of such are discussed herein. The pre-warped signal generated by the SCC 218 may be routed to the output drive 220, which can contain hardware having sufficient power to drive a motor. In some examples, the pre-warped signal can modify an applied phase voltage to drive the motor.

In some examples, BEMF data can be input from the BEMF ADC circuit 212 into the SCC 218 in order to generate a pre-warped signal. In some examples, the BEMF may be measured once a motor has finished a spin-up process and measurements can be taken for one full mechanical revolution of the spindle, although BEMF measurements may be obtained at other points during the motor's operational cycle. When the BEMF is measured, the data may initially be in the form of an analog signal and can be digitized by one or more analog to digital converters (ADCs). The SCC 218 may perform an analysis of the BEMF measurements to generate the pre-warped signal.

Figure 3:
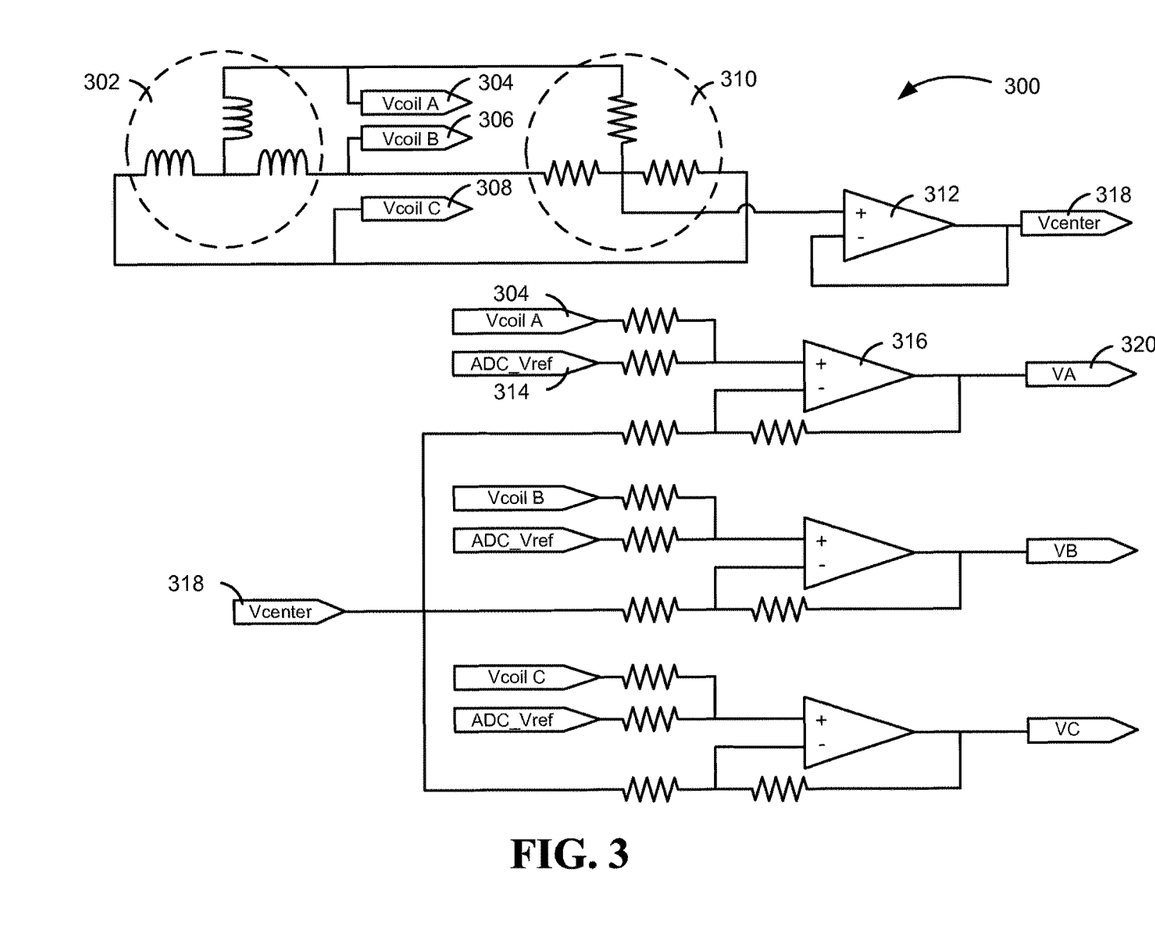
FIG. 3 is a diagram of a system for torque disturbance cancellation for a motor, in accordance with certain embodiments of the present disclosure.

Referring to FIG. 3, a system for torque disturbance cancellation for a motor is shown and generally designated 300. The system 300 presents example circuits configured to condition a measured BEMF of a three-phase motor to ensure that the BEMF signal range falls within an input range of an ADC, thus preventing the BEMF signal from being clipped and eliminating information loss. In some examples, an ADC may digitize the measured BEMF waveform so that it can be processed by a signal correction circuit (SCC) to generate a pre-warped signal. The system 300 may represent examples of several components including: voltage coils of an electric motor 302, BEMF measuring points for each phase of the electric motor, 304, 306, 308, a center tap reference voltage circuit 310, a buffer 312, a buffered center tapped voltage 318, a reference voltage generated by the ADC 314, a difference amplifier 316, and a conditioned BEMF signal 320.

The voltage coils 302 of a three-phase motor, which may have phases A, B, and C, can generate a BEMF that may be measured at points Vcoil A 304, Vcoil B 306, and Vcoil C 308. In some instances, a center tap may be necessary in order to generate a reference voltage for use in other parts of the circuit. However, some electric motors may not have a center tap. In such cases, a buffered center tap reference voltage, Vcenter 318, may be generated by summing the voltages of the voltage coils, for example center tap reference voltage circuit 310, and buffering the summed voltages at buffer 312.

A variable gain difference amplifier 316 can operate at a bias voltage of Vcenter 318 and can amplify the sum of Vcoil A 304 and the reference voltage of the ADC, ADC_Vref 314, by a variable amount. The variable gain may be programmed using a variety of techniques and communication protocols, including I2C, SPI, microprocessors, firmware, and so forth, and may contain a plurality of gain settings. After the BEMF signal has been amplified 320, it may continue to the ADC to be digitized where it can then be processed by an SCC. This process may occur in all three phases of the motor, and the gain of each difference amplifier may be different for each phase of the motor.

The system 300 is optional; other circuits and methods, such as external processing, may supply the SCC with the BEMF data it can use to determine a pre-warped (i.e. distorted) applied phase voltage.

In some examples, a profile memory may contain information pertaining to the shape of a voltage waveform used to drive a motor. The voltage waveform profile may be a plurality of shapes, such as a sine wave or a double arch, and may be the same or different for each phase. The signal correction circuits may contain correction signals, which may be different for each phase, based on BEMF analysis that, when summed with the waveform in the profile memory can generate a pre-warped signal to produce a properly distorted current waveform and a sinusoidal torque profile with no ripple. In another embodiment, the SCC may contain correction signals that, when summed with a waveform in the profile memory, can generate a pre-warped signal.

Figure 4:
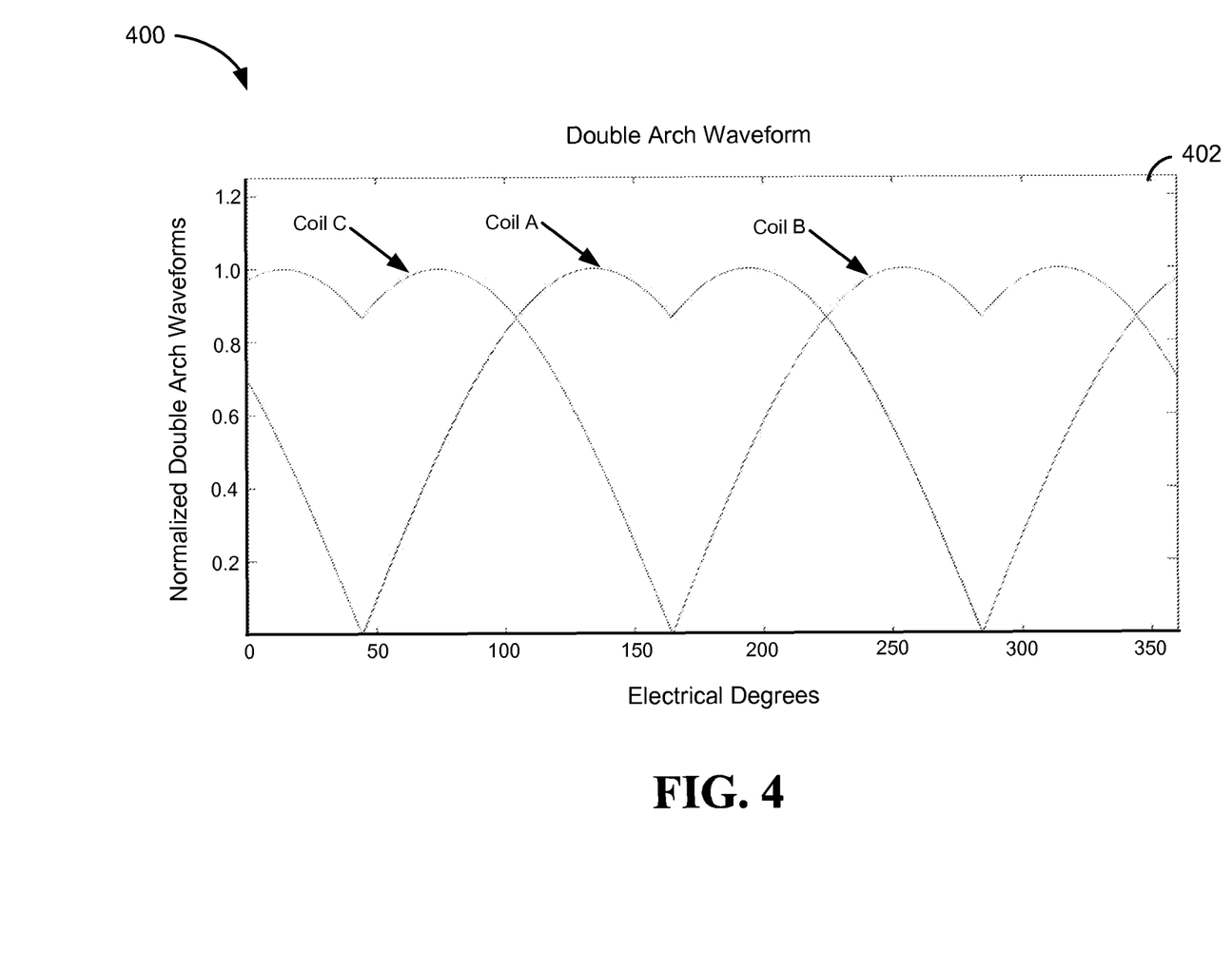
FIG. 4 is a chart illustrating a waveform for torque disturbance cancellation for a motor, in accordance with certain embodiments of the present disclosure.

Referring to FIG. 4, a chart illustrating a waveform for torque disturbance cancellation for a motor is shown and generally designated 400. To obtain pure-sine phase torque developed on a spindle phase, a sinusoidal voltage (and resultant sinusoidal current) can be applied to a spindle with sinusoidal BEMF. However, spindle motors do not have pure-sinusoidal BEMF. The resulting torque ripple caused by driving real (non pure-sinusoidal) motors with a sinusoidal voltage causes acoustic emissions in the form of Prominent Discrete Tones (PDTs). Utilizing a voltage-mode spindle driver, it is possible to modify the applied voltage waveform to generate either pure-sine phase current or pure-sine phase torque, based on measured spindle BEMF.

The waveform 400 can be a voltage waveform and may be applied to each phase of an electric motor. In some embodiments, the waveforms on each of the phases can be offset by 120 degrees with respect to the other phases. The plot 402 shows an example of a double arch waveform that can be applied to each phase of a three phase motor, where each phase of the motor can be 120 degrees out of sync in relation to the other motor phases, and where the voltage amplitudes of the three signals have been normalized.

The resultant phase current for a waveform, such as the example double arch waveform shown in plot 402, can be described by the following equation:

$$I_{\Theta MCD} = (K CONTROL * V_{\Theta MCD} - V_{\Theta BEMF} - V_{CT})/Z_{\Theta}$$

where KCONTROL may be a firmware-controllable amplitude of the applied voltage, $V_{\varnothing MCD}$ is the double arch voltage, $V_{\varnothing BEMF}$ is the BEMF voltage, $V_{CT}$ is the center tap voltage of a motor, and $Z_\varnothing$ is the impedance of a motor coil of phase Ø. The phase current for each phase can be calculated separately; an example formula for calculating the phase current for coil A is shown below.

$$I_{AMCD} = (KCONTROL * V_{AMCD} - V_{ABEMF} - V_{CT})/Z_A$$

In some embodiments, a signal correction circuit (SCC) can generate a pre-warped signal that, when applied to the distorted BEMF, may result in a sinusoidal phase current with a harmonic distortion which can result in the reduction or elimination of acoustic emissions of a motor. Since $V_{\varnothing BEMF}$ may not be a pure sinusoid, $I_{\varnothing MCD}$ may not be a pure sinusoid either. In such cases, correction of a distorted BEMF signal can be done, such as by using the following formula:

$$V_{\varnothing PSCurrent} = KCONTROL * V_{\varnothing MCD} + (V_{\varnothing BEMF} - V_{\varnothing PS})$$

where $V_{\varnothing PSCurrent}$ may be the spindle voltage required to obtain a sinusoidal phase current with a desired harmonic distortion and $V_{\varnothing PS}$ is a pure sine wave having an amplitude equal to $V_{\varnothing BEMF}$. A correction factor, $(V_{\varnothing BEMF} - V_{\varnothing PS})$, may be used by the SCC in the following equations to generate a pre-warped signal that, when applied to a distorted BEMF, may generate a sinusoidal phase current with a harmonic distortion, which can result in the reduction or elimination of acoustic emissions of a motor. Thus, the phase current can be calculated by:

$$I_{\varnothing PSCurrent} = (V_{\varnothing PSCurrent} - V_{\varnothing BEMF} - V_{CT})/Z_\varnothing$$

$$I_{\varnothing PSCurrent} = (KCONTROL * V_{\varnothing MCD} - V_{\varnothing PS} - V_{CT})/Z_\varnothing$$

where $I_{\varnothing PSCurrent}$ may be the spindle current required to obtain a low harmonic sinusoidal phase current.

In other embodiments, the SCC can generate a pre-warped signal that, when applied to the distorted BEMF, may result in a reduction or elimination of torque ripple. Torque, $\tau_\varnothing$, for an electric motor may be calculated by multiplying the phase current, $I_\varnothing$, by a constant $K_{T\_\varnothing}$. The BEMF may be proportional to $K_{T\_\varnothing}$, which may result in the following torque equation:

$$\tau_\varnothing = \frac{V_{\varnothing BEMF}}{\omega} * I_\varnothing$$

where $\tau_\varnothing$ is the torque for a phase Ø of a motor and $\omega$ is the motor speed.

When the motor is driven with a pure-sine current, the torque can be broken up into two components: a pure-sine component and a distortion component:

$$\tau_\varnothing = \left(\frac{V_{\varnothing BEMFPS}}{\omega} * I_{\varnothing PSCURRENT}\right) + \left(\frac{V_{\varnothing BEMFDIS}}{\omega} * I_{\varnothing PSCURRENT}\right)$$

where $V_{\varnothing BEMF\_PS}$ is the pure-sine component of $V_{\varnothing BEMF}$, and $V_{\varnothing BEMF\_DIS}$ is the distortion component of the $V_{\varnothing BEMF}$. To correct for the distortion component, a compensation current component may be added as follows:

$$\tau_{\varnothing COMP} = -1 * \left(\frac{V_{\varnothing BEMFDIS}}{\omega} * I_{\varnothing PSCURRENT}\right)$$

$$I_{\varnothing COMP} = \frac{\tau_{\varnothing COMP}}{(V_{\varnothing BEMF}/\omega)} = -\left(\frac{V_{\varnothing BEMFDIS}}{V_{\varnothing BEMF}} * I_{\varnothing PSCURRENT}\right)$$

where $I_{\varnothing COMP}$ is the compensating current that can be used to produce compensating torque $\tau_{\varnothing COMP}$. Converting to a voltage correction:

$$V_{\varnothing COMP} = -\frac{\left(\frac{V_{\varnothing BEMFDIS}}{V_{\varnothing BEMF}} * I_{\varnothing PSCURRENT}\right)}{Z_\varnothing}$$

where $V_{\varnothing BEMF\_DIS}$ may be the distorted components of the BEMF signal and $V_{\varnothing COMP}$ can be a compensation voltage which may be added to $V_{\varnothing PSCURRENT}$ in order to reduce or eliminate torque ripple or acoustic emissions.

Figure 5:
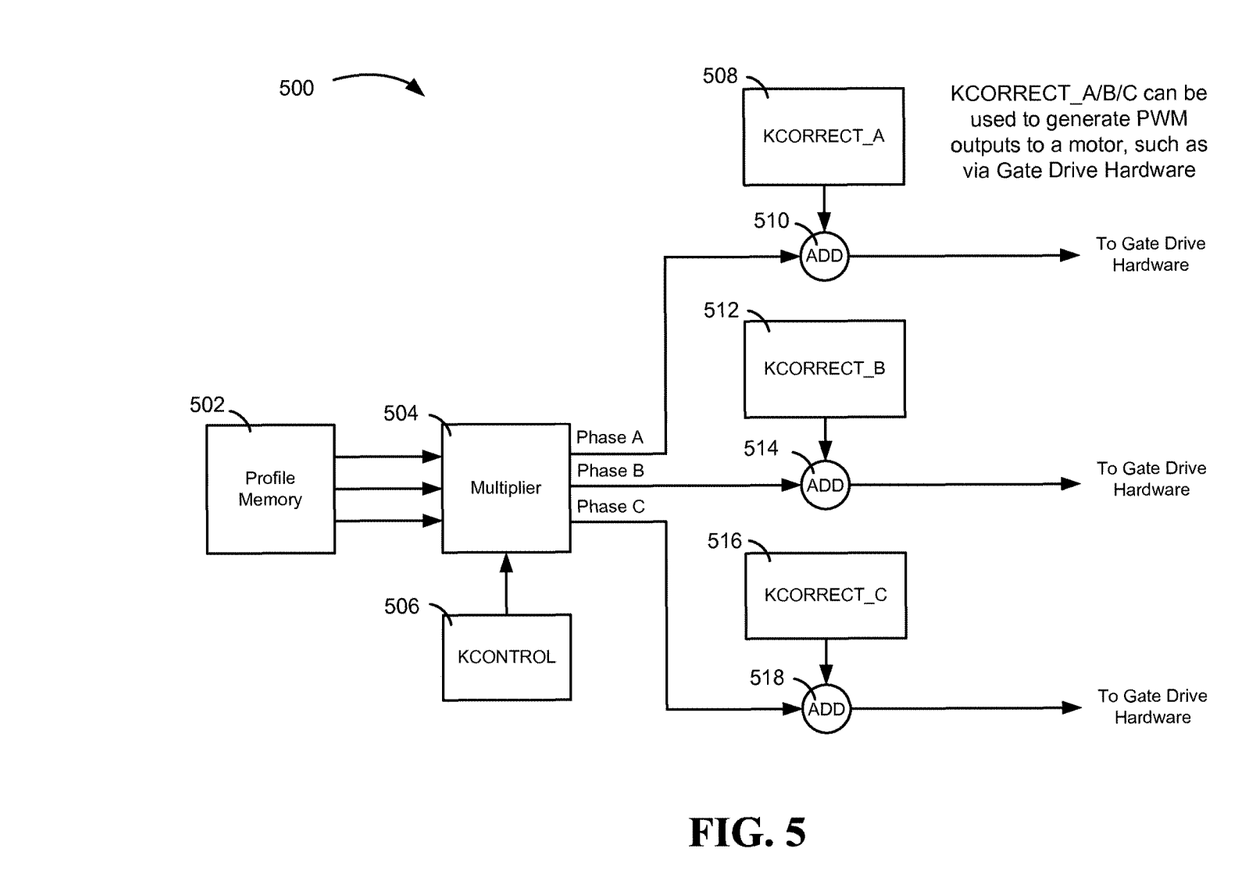
FIG. 5 is a diagram of a system for torque disturbance cancellation for a motor, in accordance with certain embodiments of the present disclosure.

Referring to FIG. 5, a system configured for torque disturbance cancellation for a motor is shown and generally designated 500. The system 500 may include a profile memory 502 and a multiplier 504. In some examples of a motor driver, an output voltage waveform may be stored in a profile memory of the motor driver. The profile memory 502 may contain a plurality of profiles, including profiles for voltage-mode or current-mode drivers. In some examples, the profile memory can contain a lookup table containing a single phase double arch profile, although in some embodiments, a profile memory may contain multiple lookup tables, and each lookup table may contain data for multiple phases. Also, the profile memory or a lookup table can include data representing correction data for a single electrical revolution (i.e. based on the electrical phases of the motor) or correction data for a full mechanical revolution (i.e. based on the mechanical position of the motor). In a three-phase system, each phase may be generated 120 degrees out of phase with respect to the other two phases.

The waveform from the profile memory may be input to the multiplier 504, which may be digital or analog, and can multiply the profile waveform by the waveform generated by a register KCONTROL 506. KCONTROL 506 can contain information that, when multiplied by the profile waveform, can alter the amplitude of the waveform profile and may affect the speed of a motor. The ability to either change motor speeds, or to maintain motor speed under changing torque conditions may be useful during processes like track seek and spin-up of a disc drive. The digital values in KCONTROL 506 may be determined by signal correction circuits, firmware, a microprocessor, control circuits, or any combination thereof.

The multiplied profile waveform for each phase of the motor may go to an adder circuit specific to that phase. The adder circuit 510 can sum a phase of the multiplied profile waveform, phase A, with the information from the register KCORRECT_A 508. KCORRECT_A 508 may contain correction signals derived from BEMF measurements. The correction signals stored to KCORRECT_A 508 can be summed with the phase A signal of the multiplied profile waveform, which may result in a pre-warped signal that can be routed to drive a motor, such as via gate drive hardware. In some embodiments, the outputs of KCORRECT_A 508, KCORRECT_B 512, and KCORRECT_C 516, can be digital representations of a pulse-width modulated (PWM) signal, while in other embodiments they may be of different signal types, such as sinusoidal. In yet additional embodiments, KCORRECT_A 508, KCORRECT_B 512, and KCORRECT_C 516 can be digital to analog converters whose outputs may be PWM, sinusoidal, or other types of signals.

In an embodiment where a motor has three phases, separate correction signals may be calculated for each phase based on the measured BEMF and other parameters. For example, the correction signal for phase B may be different than for phase A; the correction signals in KCORRECT_B 512 may be the same or different than those in KCORRECT_A 508, and may be summed with the multiplied profile waveform separately at 514. The pre-warped applied phase voltages, at 510, 514, and 518 can be input to the gate drive hardware which, in turn, may route them to the motor. The result of these operations can be a reduction or elimination of the torque ripple and consequently an elimination of the vibrations and acoustic emissions.

In some examples, an SCC may determine the pre-warped signal at any time during the operating cycle of the motor. Further, the pre-warped signal may be determined after a spin-up process has completed and a motor is running at an operating speed.

When a spindle motor starts a spin-up process, it can accelerate from a stationary position to a steady state rotational speed (i.e. target RPM or target speed) and once the motor reaches the steady state rotational speed, the BEMF can be measured for each phase of the motor during a single electrical revolution of the motor (i.e. based on the electrical phases of the motor) or a full mechanical revolution of the motor (i.e. based on the mechanical position of the motor), although in some embodiments the BEMF may be measured over multiple rotations of the motor, or a fraction of a rotation of the motor. In other examples, BEMF measurements taken at speeds other than the steady state rotational speed may be usable because, generally, the shape of the BEMF waveform should remain substantially the same, although the amplitude may vary. Thus, in some examples, one could measure the BEMF at one-half the steady state rotational speed and multiply the BEMF waveform(s) by a factor of 2 to achieve a representation of the BEMF at the target speed. The BEMF measurement may be stored into memory and then used by a signal correction circuit to calculate a pre-warped signal.

In some embodiments, zero cross detectors may be used to keep the primary spindle driving waveform synchronized with the motor position. There may be a plurality of zero crossings per mechanical rotation. In a particular embodiment, there may be four zero crossings per mechanical rotation.

Determination of a pre-warped signal may require an SCC to know an exact rotational position of the motor; however, the SCC may operate based on an assumed rotational position of the motor. When the rotational position value used by the SCC and the actual rotational position of the motor are not synchronous, but in fact are fractions of a degree to many degrees out of sync, the pre-warped waveform may not eliminate acoustic emissions. Thus, the correction signal and pre-warped waveform can be determined based on a rotational position of the motor. For example, when a BEMF measurement is taken when the rotational position of the motor is 15 degrees, the correction signal from the SCC for that particular BEMF measurement may be applied when the rotational position of the motor is 15 degrees.

In a system having a servo control system, servo gates (sgates) of a servo positioning system can be used to determine the rotational position of a motor. In some examples of a disc drive, a disc may include multiple sgates of an embedded servo system that allow for determination of a rotational position of the disc(s) and hence the rotor of a motor spinning the disc(s). Further, in the disc drive example or other systems with sgates, the system 500 can use the sgates from the servo system as interrupts to trigger a BEMF measurement. At each of these interrupts, a BEMF measurement can be taken for each of the motor phases. In some embodiments, there may be 200 sgates on a disc. The number of sgates per revolution may affect the frequencies that can be compensated for by the SCC in order to generate a pre-warped waveform. For example, the SCC may be able to develop correction signals for higher BEMF distortion frequencies with a higher sgate count than it could do with a lower sgate count, much like a data converter with a higher sampling rate can capture higher frequency electrical signals more accurately than a data converter with a lower sampling rate.

In some embodiments, a BEMF measurement for each phase of a motor may be taken at each sgate and can be stored into memory. In an example where there are 200 sgates per mechanical revolution of the motor, there may be a total of 600 BEMF measurements that can be stored into memory for a three-phase motor. A lookup table for such a system may have three columns, one for each of the phases of the motor, with 200 rows of data, one for each trigger of a BEMF measurement. In some embodiments, where other parameters are measured, such as cogging torque, the lookup table may have more rows or columns. An example of a lookup table is provided in FIG. 6.

An SCC can make pre-calculations based on each phase's rows of measured BEMF data. A profile of correction signals may be generated by the SCC and sent to registers to be summed with the profile of the original waveform. The registers, which may be KCORRECT_A 508, KCORRECT_B 512, and KCORRECT_C 516, may each correspond to a profile containing one column and a number of rows equal to the number of sgates; for example, 200 rows of correction signals where there are 200 sgates.

A pre-warped signal (or waveform) may be many sgates long. In some examples, a pre-warped signal may be as long as all the sgates on a disc. That is, a signal may occur for an amount if time it takes N sgates to complete one rotation of a disc having N sgates. The sgates can be located at different physical locations of a disc. Accordingly, there can be a certain period of time that elapses between each sgate occurrence, and that time can depend on the rotational speed of the motor. For example, in an embodiment where there are X number of evenly spaced sgates on a disc rotating at Y revolutions per second, there may be X*Y sgates per second, or 1/(X*Y) seconds between sgate occurrences. When summed over a period of time, t seconds for example, the correction signals of each sgate can construct t seconds of the pre-warped signal.

Once the correction signals for each analog or digital register are determined, the process of generating a pre-warped signal can occur. The register for each phase may send a correction signal corresponding to an sgate at the rotational position of the motor to be summed with the multiplied profile waveform, at the adder 510. For example, when a disc rotates to the next sgate, the next correction signal corresponding to the next sgate may be summed with the next data point in the multiplied profile waveform.

Figure 6:
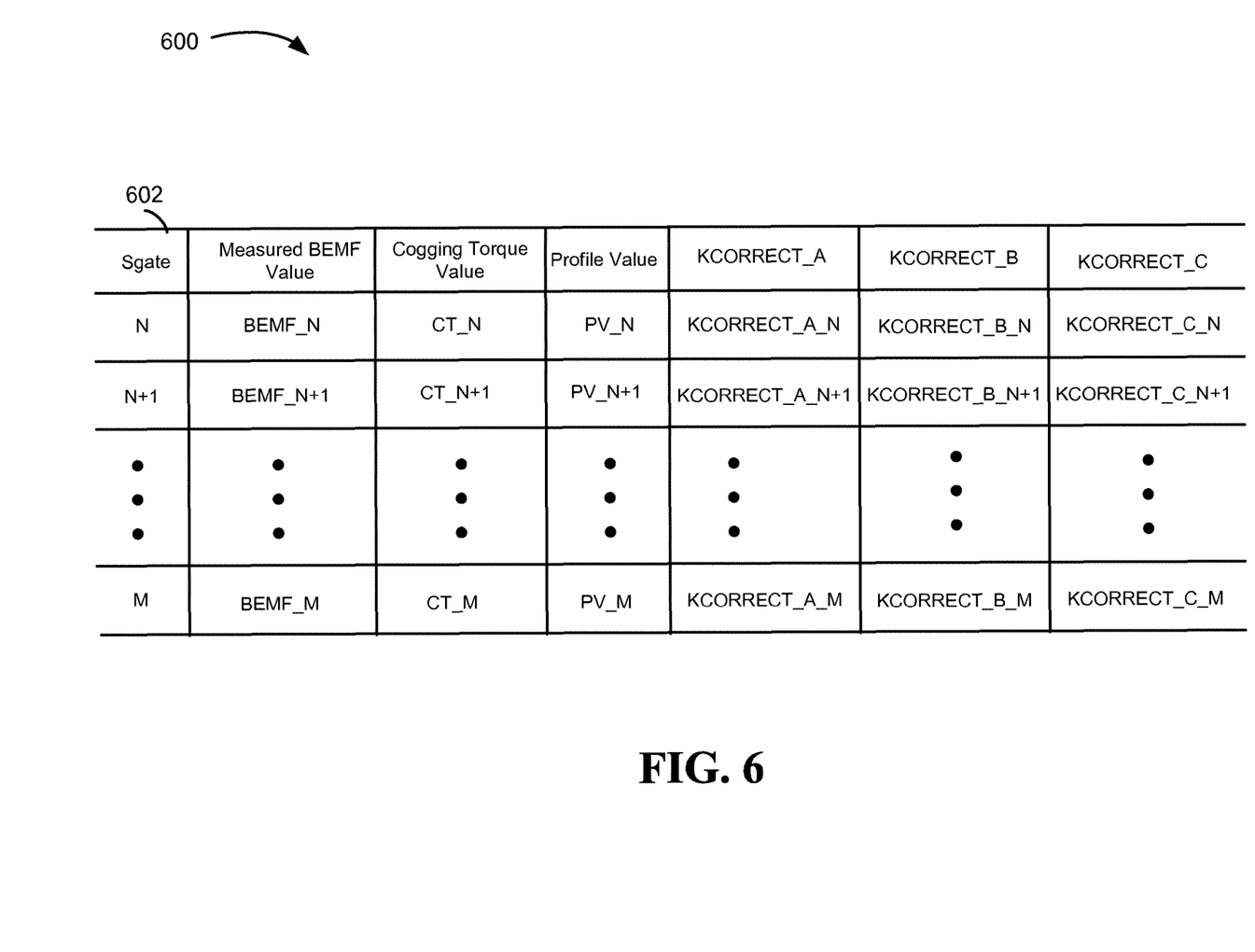
FIG. 6 is a chart illustrating a table for torque disturbance cancellation for a motor, in accordance with certain embodiments of the present disclosure.

Referring to FIG. 6, a chart illustrating a table for torque disturbance cancellation for a motor is shown and generally designated 600. The table 600 can show different input and output values that can be indexed with respect to sgates, such as in the Example of FIG. 5. The table can include a column 602 identifying each sgate of a system, for example starting at sgate N, may increment by successive sgates, and can end at sgate M. The number of rows and columns can be changed depending upon the number of sgates, what input parameters, such as BEMF or cogging torque, are used and the number of phases of the motor.

When the motor speed is to be changed, the amplitude of KCONTROL may be increased or decreased as necessary. After the speed is adjusted by KCONTROL, operating parameters such as BEMF, cogging torque, or temperature may be re-measured, and new correction signals may be calculated and stored into the table in memory. The table may be stored in volatile or nonvolatile memory. The SCC and motor may be synchronized with a zero cross and the process of generating a pre-warped signal with new correction signals may start again.

Figure 7:
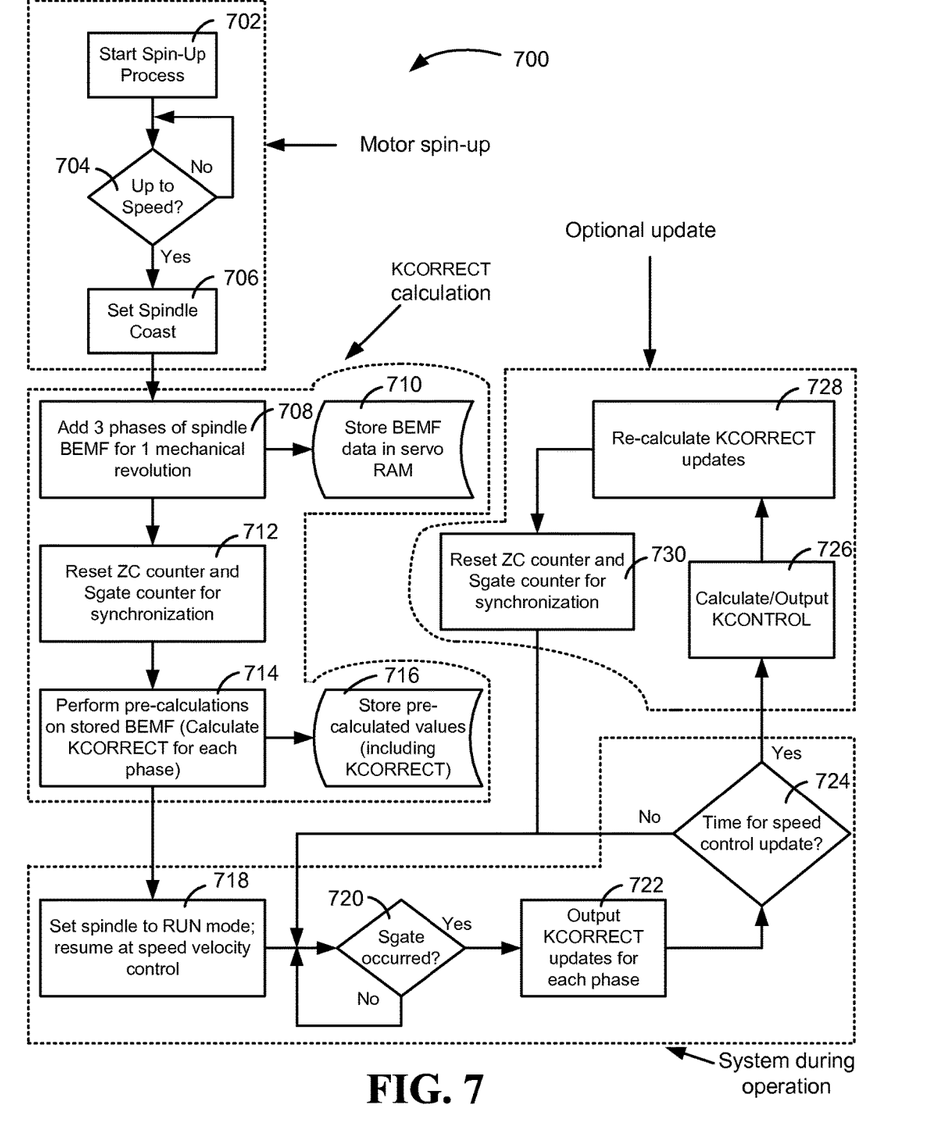
FIG. 7 is a flowchart of a method for torque disturbance cancellation for a motor, in accordance with certain embodiments of the present disclosure.

Referring to FIG. 7, an illustrative example of a method for torque disturbance cancellation for a motor is shown and generally designated 700. The method 700 may include four general functions: motor spin-up, KCORRECT calculations, system during operation, and optional update.

Initially, a motor may go through a spin-up process. Motor spin-up can be the process by which a stationary motor can start to rotate at increasing speed until a target speed is reached. In a disc drive example, motor spin-up can be initiated with a start spin-up process command, at 702. As the motor's speed is increased, it can be measured and checked against the target speed, at 704. When the motor speed is less than the target speed, the motor speed can continue to increase. When the motor speed reaches the target speed, the motor may stop accelerating, and the spindle can coast at the motor's steady state rotational speed, at 706.

KCORRECT calculations can include a series of steps where measured data from the BEMF and other operating parameters may be calculated and stored in memory. In an example, three phases of BEMF measurements can be acquired over one mechanical revolution of the motor and can be summed, at 708, to produce BEMF data, which can be stored in a memory, such as a servo system's random access memory (RAM), at 710. In other examples, measured data for other operating parameters, such as cogging torque, may also be stored in memory. In yet another example, the steps of measuring the BEMF may be included as part of the KCORRECT calculation process.

Further, at a known rotational position of the motor, a zero-cross (ZC) counter may be reset, at 712, which may aid in keeping the SCC synchronized with the motor BEMF. In addition, a servo gate (sgate) counter may be reset, at 712. Servo gates (sgates) may be marks for a servo positioning system, such as an embedded servo system on a data disc, and can also be used to determine the rotational position of the motor.

Pre-calculations can be determined on the BEMF data or other parameters stored in memory, at 714. In some examples, the pre-calculations may be stored in a table form with three columns of data, one for each phase of the motor, and the table may contain a number of rows of correction signals that may equal the number of sgates. However, the number of rows of correction signals does not need to be equal to the number of sgates, such as if a range of sgates has the same or a similar enough correction signal. The pre-calculations can be stored in memory for KCORRECT updates, at 716.

The system during operation function of method 700 may include operating the motor under normal conditions and applying the pre-calculations (KCORRECT updates). For example, the motor can be set to an optimal operating speed, at 718, and a sgate detector can detect when an sgate occurs, at 720. When an sgate occurs, output registers for each motor phase can update their respective corrective signals so that the new update signals may correspond to the current sgate, at 722. The registers can get their corrective signals from the stored pre-calculated values and can sum them with the corresponding signals of the profile memory to generate a portion of the pre-warped signal corresponding to the current sgate. For example, when a pre-warped signal is 50 sgates long, a portion of the correction signal associated with one sgate can comprise 1/50 of the pre-warped signal.

The motor may, from time to time, need to change rotational speeds or change the torque. A motor driver may check to see if a speed update is necessary, at 724. When no speed update is required, the motor may continue to rotate at its present speed and can continue to update the KCORRECT registers at or after each sgate. In some examples, a check for speed control updates may occur in-between sgate checks, and circuits and systems other than a motor driver, such as firmware, a microprocessor, or logic circuitry, may be used to check for speed updates. Also, the method 700 may update the pre-warped waveform calculations when there is a change in torque required of the motor. From above, a need for recalculation of the pre-warped waveforms may be due to a change in the variable $I_{\varnothing PSCurrent}$, which can then cause a recalculation of the pre-warped waveforms based on the current environmental conditions.

The optional update function may contain circuitry to update rotational speed, torque, and pre-calculations based on updated parameters, such as new BEMF measurements, change in torque, motor temperature, motor speed, other parameters, or any combination thereof. When a motor driver determines a speed update is necessary, the values of KCONTROL can be updated, at 726. New calculations for the KCORRECT registers can be made, at 728, based on the previous BEMF measurements or new BEMF measurements, and can include adjustments for other parameters as well. Once the KCORRECT registers have been updated, the ZC counter and the sgate counter can be reset or checked to verify synchronization, and the method 700 can continue to operate by checking for sgates and outputting KCORRECT updates based on corresponding sgates.

Figure 8:
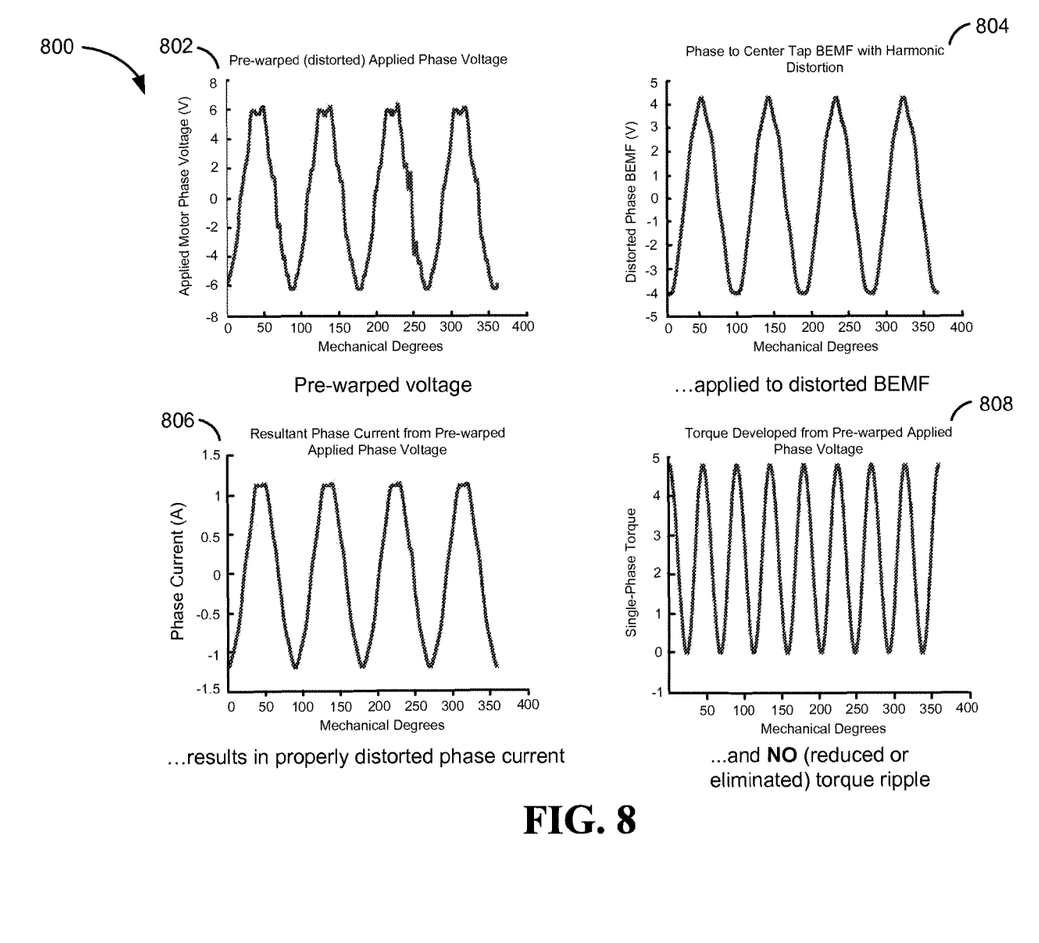
FIG. 8 is a set of charts illustrating a method of torque disturbance cancellation for a motor, in accordance with certain embodiments of the present disclosure.

Referring to FIG. 8, a set of charts illustrating a method of torque disturbance cancellation for a motor is shown and generally designated 800. In this example, measured BEMF distortion can be used by a signal correction circuit to determine a pre-warped signal (such as the pre-warped applied phase voltage shown in the chart) 802. When the pre-warped applied phase voltage 802 is applied to distorted BEMF 804, a properly distorted phase current 806 may be produced. The distorted phase current 806 may result in reduced or eliminated torque ripple 808 when it is applied to drive a motor. A reduced or eliminated torque ripple may equate to reduced or eliminated vibrations or acoustical emissions.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   measuring operating parameters for each phase of a three-phase spindle motor that drives a spindle to rotate, the operating parameters including back electromotive force (BEMF) measurements;
   summing the operating parameters from each of phase of the three-phase spindle motor to produce BEMF data and storing the BEMF data in a memory;
   determining a correction signal for multiple positions of the spindle and for each phase of the three-phase spindle motor based on the operating parameters, the correction signal generated to reduce torque disturbance at the spindle motor;
   storing a correction value representing the correction signal for each position and each phase;
   for each position of the multiple positions of the spindle, generating a waveform having distortion based on the correction signal including:
     retrieving a profile waveform from at least one lookup table stored in a memory;
     multiplying the profile waveform by a scaling factor for each phase of the spindle motor to produce a scaled profile waveform that alters an amplitude of the profile waveform; and
     providing the scaled profile waveform to an adder circuit for each phase of the motor; and
     adding, separately for each phase of the motor, a phase of the scaled profile waveform with one of the correction value associated with a corresponding position of the spindle and phase of the spindle motor; and
   applying the waveform to control operation of the spindle motor.

2. The method of claim 1, wherein the correction signal is a sinusoidal phase current with a harmonic distortion that results in elimination of acoustic emissions of the spindle motor.

3. The method of claim 1 further comprising the correction signal is variable for each phase.

4. The method of claim 1 further comprising:
   measuring back electromotive force (BEMF) voltage of the spindle motor;
   determining a center tap voltage of the spindle motor by summing the BEMF on each voltage phase of the spindle motor;
   summing the BEMF voltage from a phase of the spindle motor with a reference voltage to produce a summed voltage;
   amplifying the difference between the summed voltage and the center tap voltage;
   inputting the amplified difference into an analog-to-digital converter (ADC) to generate a digitized signal; and
   determining the correction signal based on the digitized signal.

5. The method of claim 1 further comprising:
   determining the BEMF data based on one full mechanical revolution of the spindle of the spindle motor.

6. The method of claim 2 further comprising:
   determining a rotational position of the spindle motor in response to servo position indicators on a disc attached to a spindle of the spindle motor; and
   adjusting the correction signal based on the rotational position of the spindle, the adjusting occurring continuously throughout rotation of the spindle.

7. The method of claim 6 further comprising:
   storing in memory a value of the correction signal corresponding to multiple servo position indicators at various rotational positions on the disc;
   retrieving a selected value for the correctional signal in response to a specific servo position indicator; and
   applying the selected value as the correction signal.

8. An apparatus comprising:
   a memory configured to store a profile waveform for driving a spindle motor and to store data representing a correction signal, the data including correction values for each phase of the spindle motor at each of multiple rotational positions of the spindle;
   a circuit configured to adjust a correction signal for each phase of a spindle motor based on a rotational position of a spindle of the spindle motor and back electromotive force (BEMF) data, the correction signal configured to reduce torque disturbance at the spindle motor, the circuit including:
     a multiplier circuit configured to:
       multiply a profile waveform by a scaling factor for each phase of the spindle motor to produce a scaled profile waveform for each phase based on a corresponding rotational position of the spindle;
       provide the scaled profile waveform to an adder circuit for each phase of the motor;
     multiple adder circuits, at least one for each phase of the spindle motor, the adder circuits configured to:
       receive the scaled profile waveform for a corresponding phase;
       add the correction values corresponding to a rotational position and specific phase to the scaled profile waveform to produce a distorted waveform for each phase; and an output configured to drive the spindle motor in response to the distorted waveform, the spindle motor including a spindle directly connected to the motor.

9. The apparatus of claim 8 comprising the circuit further configured to:

monitor servo position indicators on a disc attached to the spindle, the servo position indicators providing an indication of the multiple rotational positions;

when a servo position indicator occurs, update values of the correction signal for each phase of the spindle motor to produce an updated correction signal; and generate the distorted waveform for each phase of the spindle motor based on the updated correction signal.

10. The apparatus of claim 9 comprising the circuit further configured to update the correction signal individually for each phase of the spindle motor.

11. The apparatus of claim 8 comprising the circuit further configured to:

determine when a speed control update for the spindle motor occurs; and re-calculate the data of the correction signal stored in memory in response to the speed control update.

\* \* \* \* \*